(12) United States Patent
Buhler et al.

(10) Patent No.: US 9,034,974 B2
(45) Date of Patent: May 19, 2015

(54) POLYAMIDE MOULDING MATERIALS CONTAINING COPOLYAMIDES FOR PRODUCING TRANSPARENT MOULDING PARTS WITH LOW DISTORSION IN CLIMATIC TESTING

(75) Inventors: Friedrich Severin Buhler, Thusis (CH); Etienne Aepli, Domat/Ems (CH); Sepp Bass, Domat/Ems (CH)

(73) Assignee: EMS-PATENT AG, Dormat/EMS (CH)

( * ) Notice: Subject to any disclaimer, the term of this patent is extended or adjusted under 35 U.S.C. 154(b) by 435 days.

(21) Appl. No.: 12/989,531

(22) PCT Filed: Apr. 21, 2009

(86) PCT No.: PCT/EP2009/054716
§ 371 (c)(1),
(2), (4) Date: Oct. 25, 2010

(87) PCT Pub. No.: WO2009/132989
PCT Pub. Date: Nov. 5, 2009

(65) Prior Publication Data
US 2011/0040023 A1    Feb. 17, 2011

(30) Foreign Application Priority Data
Apr. 30, 2008   (EP) .................... 08 008285

(51) Int. Cl.
*C08L 77/06* (2006.01)
*C08G 69/26* (2006.01)
*C08L 77/00* (2006.01)
*C08L 77/12* (2006.01)

(52) U.S. Cl.
CPC ............ *C08L 77/06* (2013.01); *C08G 69/265* (2013.01); *C08L 77/00* (2013.01); *C08L 77/12* (2013.01); *C08L 2205/02* (2013.01)

(58) Field of Classification Search
CPC ..................................................... C08L 77/06
USPC ................................................. 524/607, 538
See application file for complete search history.

(56) References Cited

U.S. PATENT DOCUMENTS

| 4,195,164 A | 3/1980 | Meyer et al. |
| 2003/0235666 A1* | 12/2003 | Buhler .................... 428/35.7 |

FOREIGN PATENT DOCUMENTS

| DE | 2 217 016 A1 | 10/1972 |
| DE | 43 10 970 A1 | 10/1994 |
| DE | 100 09 756 A1 | 9/2001 |
| EP | 0 001 039 A | 3/1979 |
| FR | 2902435 A1 * | 12/2007 |
| WO | 2008/006991 A2 | 1/2008 |

* cited by examiner

*Primary Examiner* — Wenwen Cai
(74) *Attorney, Agent, or Firm* — Sughrue Mion, PLLC

(57) ABSTRACT

Polyamide molding materials for transparent molding parts. The materials comprise transparent copolyamides that contain: (A) 40 to 100 wt % of at least one transparent copolyamide with a glass transition temperature ($T_g$) of at least 80° C. and not more than 150° C., composed of at least two diamines that are different from each other, wherein the at least two diamines are a mixture of (a) 50 to 90 mol % bis-(4-amino-3-methylcyclohexyl)methane (MACM) and/or bis-(4-amino-3-ethylcyclohexyl)methane (EACM) and/or bis-(4-amino-3,5-dimethylcyclohexyl)methane (TMACM) and b) 10 to 50 mol % aliphatic diamine having 9 to 14 carbon atoms, in particular decandiamine, particularly preferably at least 20 mol % decandiamine, each relative to the total amount of diamines, and of one or more aliphatic dicarboxylic acids, having 6 to 36 carbon atoms, (B) 0 to 60 wt % of at least one further polymer, (C) 0 to 10 wt % of additives, the sum of the components (A), (B) and (C) totaling 100% by weight.

19 Claims, No Drawings

POLYAMIDE MOULDING MATERIALS CONTAINING COPOLYAMIDES FOR PRODUCING TRANSPARENT MOULDING PARTS WITH LOW DISTORSION IN CLIMATIC TESTING

TECHNICAL FIELD

The invention relates to novel polyamide molding compositions which feature markedly better processability, in particular in the injection-molding process, with acceptable deformation in the controlled-climatic-conditions test, with very good transparency, with low haze, and indeed with increased biocontent.

The invention therefore in particular relates to novel molding compositions based on transparent copolyamides which are used for producing transparent moldings, in particular injection moldings with stringent technical requirements and with high-quality surfaces, in particular in the visible region. The molding compositions of the invention further feature high toughness, low water absorption, and low warpage in the controlled-climatic-conditions test. The present invention in particular relates to novel polyamide molding compositions based on transparent copolyamides, which are based mainly on monomers accessible from renewable raw materials. The present invention likewise relates to a process for producing the polyamide molding compositions and to moldings produced from the molding compositions, examples being mobile-telephone-casing material or mobile-telephone-display material, GPS devices, MP3 players, spectacles, lenses, cameras, optical devices, and telescopes.

It is particularly preferable that the molding compositions of the invention and, respectively, the copolyamides present are composed of at least 50%, by weight of biocontent to ASTM D6866-06a (biocontent, for which the term used in that document is biobased content, cf., for example, chapter 3.3.9, measure for content of non-fossil, i.e. renewable, carbon, cf. also chapter 17). Biocontent is derived here from the ratio of the $C_{12}$ and $C_{14}$ carbon isotopes. This ratio is markedly different for fossil raw materials and for renewable raw materials, and is therefore possible to use a simple measurement technique to provide evidence of the biocontent of the polyamide molding compositions of the invention in the form of a property that unambiguously characterizes the product.

High-quality surfaces are used to promote "high end quality" positioning of automobile equipment, household devices, consumer electronics, sports equipment, and easy-clean industrial surfaces. This places high demands on the material, which must not only have the high-quality appearance but must also have resistance to breakage, flowability, extensibility, and low warpage. This requires that volume changes due to crystallization are low and that moisture absorption is low. Excellent abrasion resistance and dynamic load-bearing capability are also demanded, these being typical properties of extensible polyamides. Moldings made of the polyamide molding compositions of the invention therefore possess excellent transparency, toughness, and abrasion resistance. These moldings have high chemicals resistance and high resistance to flexural fatigue, and can therefore be used in demanding environments.

The molding compositions of the invention can be processed by known processes in known processing systems to give high-quality moldings. High-quality moldings can, as explained above, be used as mobile-telephone-casing material or mobile-telephone-display material, GPS devices, MP3 players, spectacles, lenses, cameras, optical devices, and telescopes, etc.

Users wishing by way of example to obtain certification under the ISO 14000 group of standards have to accept the requirements of economic sustainability. By way of example, they issue life-cycle analyses (life cycle assessment, LCA) concerning the $CO_2$ balance of products. A short interval between release of $CO_2$ (source) and re-immobilization (sink) is a contributory factor here, and can be achieved by using, for the biocontent in the invention, raw materials that are biologically renewable, with the values stated. The person skilled in the art therefore faces the problem of having to use materials that are environmentally advantageous, where these have hitherto been associated with disadvantageous properties. To that extent, one embodiment of the invention provides teaching aimed at eliminating said problem, because it surprisingly provides a material which is an unexpectedly high-quality transparent copolyamide and which nevertheless poses essentially no risk to the environment because it is substantially composed of renewable raw materials.

PRIOR ART

The starting compounds or monomers for plastics are nowadays generally obtained from fossil sources (petroleum). However, these are limited resources, and replacement materials are therefore being sought. There is therefore increasing interest in renewable raw materials which can be used to produce "bioplastics" or plastics with high biocontent. It is possible nowadays, through the chemical process of cracking and repolymerization, to produce molecular chains which can have properties comparable with those based on petroleum. Examples of possible plant sources are plants which produce oleic, linoleic, or linolenic acid, or castor oil or tall oil fatty acids, these being examples of vegetable oils. Erucic acid is obtained by way of example from the seeds of rapeseed, mustard, wallflower, or cress.

Renewable raw materials are therefore also becoming a genuine alternative for the plastics industry, especially because of the worldwide rise of petroleum prices, and the shortage of energy, but also because of political instability in petroleum-producing countries.

Bioplastics have advantageous properties in many sectors and therefore represent a genuine alternative to conventional fossil plastics. It is therefore reasonable to consider polyamides with biocontents above 50%. However, these are then semicrystalline polyamides with glass transition temperatures below 80C, which also lack transparency. Although typical semicrystalline polyamides are nowadays still produced from petroleum-based monomers, examples being nylon-6, nylon-11, nylon-6,6, nylon-6,9, nylon-6,10, etc., it is theoretically possible to achieve almost 100% biocontent in these materials.

Irrespective of the underlying raw material, the transparent polyamide molding compositions must nevertheless comply with the stringent requirements of the customers, i.e. not only very good optical properties but also a high level of mechanical properties and of chemicals resistance. There is also a requirement to pass a specified controlled-climatic-conditions test (see text at a later stage below).

DE 43 10 970 A1 describes transparent, amorphous polyamide molding compositions with good stress-cracking resistance and impact resistance, and also good resistance to alcohols, esters, ketones, and boiling water, where these were obtained via polycondensation of aliphatic dicarboxylic acids with trans,trans-bis(4-aminocyclohexyl)methane (PACM) and, if appropriate, with other diamines. However, the worked examples of DE 43 10 970 A1 relate exclusively to the homopolyamides PACM10 and PACM12. There are absolutely no diamine constitutions stated for theoretically possible copolyamides using a second diamine differing from the first diamine, and there is also absolutely no indication that said theoretical constitutions could have advantageous properties.

DE 100 09 756 A1 describes polyamide mixtures with improved transparency and chemicals resistance without sacrifices in terms of mechanical properties. The mixtures are composed of amorphous or microcrystalline polyamides and of semicrystalline polyamides, and also of two different phosphorus additives. The formula stated for the amorphous or microcrystalline polyamide permits a wide variety of possible combinations of diamines and aliphatic dicarboxylic acids as starting components. However, there is no description of any specific combination of two differing diamines, and certainly not of any specific constitution with particular properties (for example PA MACM10/1010). The examples present amorphous polyamides based always on only one diamine, bis(4-amino-3-methylcyclohexyl)methane (MACM), in combination with an aromatic dicarboxylic acid, isophthalic acid (IPS), and lactam-12.

DE 22 17 016 A1 describes PACM-based polyamide molding compositions for producing polyamide fibers which have improved dyeability and improved resistance to deformation phenomena at elevated temperatures. The PACM 10-12 polyamides described give microcrystalline or cloudy systems, but these are specifically what is required when producing polyamide fibers, for example because of the required drawability of the fibers. The polyamides described in DE 22 17 016, in particular the polyamide PACM 10-12, therefore give inadequately transparent moldings which also simultaneously exhibit high deformation in the controlled-climatic-conditions test.

EP-A-0 001 039 describes transparent polyamides obtained via polycondensation of mixtures of positionally isomeric diaminocyclohexylmethanes and, if appropriate, of further diamines and azelaic acid, and, if appropriate, isophthalic acid, and/or adipic acid.

DESCRIPTION OF THE INVENTION

It is therefore an object of the invention to provide molding compositions which are based on transparent copolyamides and which can be used for producing transparent moldings, in particular transparent injection moldings meeting stringent technical requirements and having high-quality surfaces ("high end quality"), in particular in the visible region, but which do not have the high glass transition temperatures of the known transparent homopolyamides, these temperatures being disadvantageous for processing. The molding compositions are intended to feature high toughness, low water-absorption, low warpage in the controlled-climatic-conditions test, i.e. maximum deformation of 4 mm, and improved processability, in particular in injection molding. A further intention is that the material can be based on renewable raw materials.

The invention achieves said object via the polyamide molding compositions based on transparent copolyamides for producing transparent moldings, in particular injection moldings with high toughness, low water-absorption, and low warpage in the controlled-climatic-conditions test, in particular deformation of the molding of at most 4 mm in the controlled-climatic-conditions test, preferably of at most 3 mm, and particularly preferably of at most 2 mm, where the deflection of a sheet of dimensions 100×100×2 mm is determined in the controlled-climatic-conditions test under its own weight at a temperature of 55° C. and with relative humidity of 95%, and to this end one edge of the sheet is raised by 25 mm and the deflection of the sheet is measured in the middle (change of position with respect to initial condition after 168 hours), where the molding compositions comprise:
(A) from 40 to 100% by weight of at least one transparent copolyamide with a glass transition temperature ($T_g$) of at least 80° C. and at most 150° C., composed of
at least two diamines differing from one another, selected from a mixture of (a) from 50 to 90 mol % of bis(4-amino-3-methylcyclohexyl)methane (MACM), and/or bis(4-amino-3-ethylcyclohexyl) methane (EACM), and/or bis(4-amino-3,5-dimethylcyclohexyl)methane (TMACM), and (b) from 10 to 50 mol % of aliphatic diamine having from 9 to 14 carbon atoms, in particular decanediamine, particularly preferably at least 20 mol % of decanediamine, based in each case on the total amount of diamines, and also
of one or more aliphatic dicarboxylic acids, in particular having from 6 to 36 carbon atoms,
(B) from 0 to 60% by weight of at least one further polymer selected from the group consisting of amorphous or semicrystalline homo- or copolyamides, polyetheresteramides, polyetheramides, polyesteramides, or a mixture of these,
(C) from 0 to 10% by weight of conventional additives selected from the group consisting of UV stabilizers, heat stabilizers, free-radical scavengers, and/or processing aids, inclusion inhibitors, lubricants, demolding aids, plasticizers, functional additives for influencing optical properties, in particular refractive index, impact modifiers, nanoscale fillers and/or additional nanoscale materials, optical brighteners, dyes, or a mixture thereof,
where the entirety of components (A), (B), and (C) gives 100% by weight.

Said object is also achieved via the process for producing the polyamide molding compositions, where polymer components (A) and (B) are produced in known pressure vessels with a pressure phase at from 250.degree. C. to 320.degree. C. with subsequent depressurization at from 250.degree. C. to 320.degree. C., with subsequent devolatilization at from 260.degree. C. to 320.degree. C., and also discharge of the polyamide molding compositions in strand form, cooling, pelletization, and drying of the pellets, compounding of components (A) and, if appropriate, (B) and, if appropriate, (C) in the form of pellets, and molding in an extruder at melt temperatures of from 220.degree. C. to 350.degree. C. to give a strand, cutting by suitable pelletizers to give pellets, where, during the compounding process, additives can be added which are desirable for modifying the molding composition, examples being processing stabilizers, color pigments, UV absorbers, heat stabilizers, flame retardants, and other transparent polyamides, or nylon-12.

Finally, said object is achieved via the moldings obtainable from the disclosed polyamide molding compositions by means of injection-molding processes and injection-compression-molding processes at melt temperatures of from 230.degree. C. to 320.degree. C., where the mold temperatures are set at from 40.degree. C. to 130.degree. C. and where, if appropriate, the mold, at temperatures from 40.degree. C. to 130.degree. C., applies compression to the hot molding, after material has been charged to the cavity.

The dependent claims contain advantageous embodiments of the invention.

One preferred embodiment of the molding compositions of the invention has biocontent of at least 50% to ASTM D6866-06 and a glass transition temperature greater than 80° C., at most 150° C. The transparency of a sheet produced from the transparent molding composition with thickness 2 mm, measured as light transmittance to ASTM D1003, is above 85%, and the haze is at most 10%. High stiffnesses (tensile modulus of elasticity greater than 1300 MPa) and high toughnesses (impact resistance at 23° C.: no fracture) are achieved for the desired use of the molding compositions of the invention. Low warpage in the controlled-climatic-conditions test is moreover achieved with the moldings produced from the molding compositions of the invention. The deflection (deformation) of a sheet of dimensions 100×100 ×2 mm in the controlled-climatic-conditions test under its own weight (55° C./95% relative humidity/duration: 168 h) is at most 4 mm, preferably at most 3 mm, and particularly preferably at most 2 mm, when the deflection is measured in the middle of the sheet.

The only monomers that are based on natural raw materials and that are available currently are aliphatic monomers. In order to obtain transparent products, they must be combined with cycloaliphatic, aromatic or branched monomer units. However, the required biocontent of at least 50% demands large amounts of aliphatic fractions, the result being firstly a reduction in glass transition temperature ($T_g$), stiffness, and light transmittance (as a measure of transparency), and secondly an increase in haze. An example that may be mentioned here is a PA10I/1010-type constitution, having biocontent above 50%. High concentration of the 10I system (I=isophthalic acid) achieves a Tg greater than 80° C., and transparency exceeds 90%, but haze at 20% is outside the range acceptable for high-quality optical applications.

MACM10/1010-type or MACM14/1014-type constitutions with biocontent above 50% are likewise preferred representatives of this type of copolyamide. Transparency is very good and haze is acceptable. Achievable $T_g$ is within the range of constitutions of the invention: above 80° C. and at most 150° C.

Surprisingly, the inventors of the present application have found that MACM 6-36/6-36 6-36 copolyamides, MACM 9-18/9-14 9-18 copolyamides, preferably MACM 9-18/10 9-18 or MACM 10-14/10 10-14 copolyamides have the desired properties. By way of example, MACM10/1010 copolyamides having MACM10 content of from 66 to 46 mol % have a glass transition temperature of at least 89° C., and biocontent is from 50 to 75%. Haze, measured on sheets of thickness 2 mm, is below 5%, and the transmittance values are high, above 93%. Gloss, measured at an angle of 20°, achieves very high values, about 150%. Gloss values rise above 100% in highly transparent materials, since the lower surface also reflects light, which is added to that from the upper surface.

For the purposes of the present application, the light transmittance value used here as a measure of transparency is always the value determined by the ASTM D1003 method (CIE-C illuminant). Light transmittance here was measured in the experiments set out below in a haze-gard plus device from BYK Gardner (DE), on 70×2 mm disks or sheets of dimensions 60×60×2 mm. The transmittance value is stated for the visible wavelength region defined as in CIE-C, i.e. with substantial intensities approximately from 400 to 770 nm. The 70×2 mm disks used here are by way of example produced in a polished mold in an Arburg injection-molding machine, where the cylinder temperature is from 200° C. to 340° C. and the mold temperature is from 20° C. to 140° C.

The transparent copolyamides of the invention therefore have the light transmittance defined here, and have either amorphous or microcrystalline morphology. The copolyamides of the invention are preferably polyamide systems where processing in high-molecular-weight form without further constituents gives transparent moldings, where the dimensions of the crystallites are therefore below the wavelength of visible light.

The MACM-, TMACM-, and EACM-based polyamides of the invention are moreover highly transparent over the entire claimed range of constitution, with only low haze.

The transparent copolyamides of the invention preferably have low enthalpy of fusion, i.e. enthalpy of fusion <5 J/g.

The moldings produced from the unreinforced molding compositions of the invention exhibit stiffness properties with modulii of elasticity of from 1300 to 2000 MPa, preferably with modulii of elasticity of from 1500 to 2000 MPa. The test specimens for measurement of Charpy impact values exhibit no fracture at room temperature (23° C.) and at −30° C.

It is preferable that polyamide component (A) is based on more than 50% of renewable raw materials. This is achieved by mainly using monomers such as azelaic acid, sebacic acid, tetradecanedioic acid, $C_{36}$-dimer fatty acid, aminoundecanoic acid, nonanediamine, decanediamine, and tetradecanediamine, where these are obtained from various vegetable oils.

An important vegetable oil for monomer production is castor oil, which is obtained from the seed of the African wonder tree (*Rizinus communis*). Castor oil is composed of from 80 to 90% of the triglyceride of ricinoleic acid, and also of other glycerides of various $C_{18}$ fatty acids. Castor oil has been used for thousands of years as a medicament, but also has a long history of use in industrial oils, cosmetics, coatings, and hydraulic oils. Sebacic acid is obtained via alkaline cleavage of castor oil at high temperatures with subsequent hydrochloric acid treatment. Pyrolytic decomposition of the methyl ester of ricinoleic acid gives heptaldehyde and the methyl ester of 10-undecenoic acid, and the latter is converted through a plurality of reaction stages into 11-aminoundecanoic acid.

Azelaic acid and brassilic acid are likewise based on natural raw materials, and these are produced via ozonolysis of oleic and, respectively, erucic acid. Erucic acid is obtained from the seed of rapeseed, mustard, wallflower, or cress.

$C_{36}$-Dimer acids are produced via thermal dimerization of unsaturated $C_{18}$ carboxylic acids or their esters. Examples of starting materials are tall oil fatty acids, and also oleic acid or linolenic acid.

Nonanediamine, decanediamine, and tridecanediamine are likewise based on natural raw materials since they are produced from the corresponding dicarboxylic acids, e.g. by way of the dinitrile route.

There are other raw materials that are of increasing industrial importance, obtained by way of example via microbiological fermentation, and these can likewise be used.

The transparent copolyamide (A) is therefore particularly preferably characterized in that it has biocontent to ASTM D6866-06a of at least 54% by weight or of at least 58% by weight. Biocontent of at least 60% by weight or of at least 65% by weight is very particularly preferred, and in particular biocontent is in the range from 50 to 75% by weight.

In order that the polyamide molding compositions of the invention have the properties demanded above, the concentration of the cycloaliphatic diamines must in particular be in the concentration range from 50 to 80 mol %, preferably in the range from 55 to 75 mol %, and particularly preferably in the range from 60 to 75 mol %, based on total diamine content. The concentration of aliphatic diamine, in particular 1,10-decanediamine, is always at least 20 mol % in accordance with the invention, preferably at least 32 mol %, based on total diamine content, and is preferably in the range from 25 to 45 mol %, and very preferably in the range from 25 to 40 mol %, based on total diamine content.

The invention uses a mixture of from 50 to 90 mol % of bis(4-amino-3-methylcyclohexyl)methane (MACM), and/or bis(4-amino-3-ethylcyclohexyl)methane (EACM), and/or bis(4-amino-3,5-dimethylcyclohexyl)methane (TMACM), and/or bis(4-amino-3-methylcyclohexyl)propane, and from 10 to 50 mol % of at least one aliphatic diamine having from 9 to 14 carbon atoms, particularly preferably having from 10 to 14 carbon atoms, in particular decanediamine, based in each case on the total amount of diamines. The invention preferably uses the aliphatic diamines 1,9-nonanediamine, 1,10-decane-diamine, 1,11-undecanediamine, 1,12-dodecanediamine, 1,13-tridecanediamine, or 1,14-tetradecanediamine, and it is particularly preferable to use, as aliphatic diamine, at least 20, 30, 50, or 100 mol %, based on total content of aliphatic diamines, of 1,10-decanediamine.

The expression PACM used in this application represents the ISO name bis(4-aminocyclohexyl)methane, which is available commercially as Dicykan 4,4'-diaminodicyclohexylmethane (CAS No. 1761-71-3). The expression MACM represents the ISO name bis(4-amino-3-methylcyclohexyl) methane, which is available commercially as Laromin C260 3,3'-dimethyl-4,4'-diaminodicyclohexylmethane (CAS No. 6864-37-5). The expressions EACM and TMACM represent bis(4-amino-3-ethylcyclohexyl)methane (EACM) and/or bis (4-amino-3,5-dimethylcyclohexyl)methane (TMACM).

For the purposes of the present invention, the expressions PACM, MACM, EACM, and TMACM are intended to include all of the trivial names, trade names, or other names familiar to the person skilled in the art, where these correspond to the chemical structures of the above compounds.

The aliphatic dicarboxylic acids preferably have from to 36 carbon atoms, in particular from 10 to 18 carbon atoms.

The aliphatic diacid used preferably comprises an acid selected from the group consisting of azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, $C_{36}$-dimer fatty acid, and mixtures thereof, where in particular the aliphatic diacid is composed of at least 20 mol % of sebacic acid, preferably at least 30 mol %, particularly preferably at least 50 mol %, based on the total amount of diacids, and where it is particularly preferable that the aliphatic diacid is exclusively sebacic acid.

The copolyamide (A) is in particular characterized by chains having the following formula (I):

$$(MACMX)_x/(10Y)_y/LC_z \qquad (I),$$

where the definitions are as follows:
X and Y=aliphatic dicarboxylic acid(s) having from 9 to 18 and 36 carbon atoms,
x=from 25 to 90 mol %,
y=from 5 to 50 mol %,
10=1,10-decanediamine,
LC=lactam(s) and/or aminocarboxylic acid(s) having from 6 to 12 carbon atoms,
z=from 0 to 50 mol %,
where x+y+z=100 mol %,
and the sum of the contents represented by X, 10Y, and LC is at least 50% by weight. If X, Y, and LC are based on renewable raw materials, the total of the % by weight values of X, 10Y, and LC is the biocontent.

Component MACMX used alone or in a mixture in formula (I) comprises amorphous units, e.g. of MACM9, MACM10, MACM11, MACM12, MACM13, MACM14, MACM15, MACM16, MACM17, MACM18, MACM36 type. The dicarboxylic acids having from 9 to 18 or 36 carbon atoms are preferably produced from non-petroleum-dependent, renewable raw materials. The diamine MACM can be completely or to some extent replaced by other alkyl-substituted derivatives of bis(4-aminocyclohexyl)methane or of bis(4-amino-3-ethylcyclohexyl)propane, in particular by bis(4-amino-3-ethylcyclohexyl)methane(EACM), and/or by bis(4-amino-3,5-dimethylcyclohexyl)methane (TMACM), and/or by bis(4-amino-3-methylcyclohexyl)propane.

Component 10Y used in the formula (I) comprises semicrystalline units, for example of PA 109, PA 1010, PA 1011, PA 1012, PA 1013, PA 1014, PA 1015, PA 1016, PA 1017, PA 1018, PA 1036 type, alone or in a mixture. It is preferable that said components are produced from a non-petroleum-dependent, renewable raw material.

Copolyamides (A) that are particularly preferred in the invention are therefore MACM9/109, MACM10/1010, MACM12/1012, and MACM14/1014.

Component LC used in formula (I) preferably comprises lactam 11 and lactam 12, and also α,ω-aminocarboxylic acids having from 10 to 12 carbon atoms, or a mixture thereof. Preference is given to lactams derived from renewable raw material, and also aminoundecanoic acid.

The glass transition temperature ($T_g$) of the copolyamide (A) is at least 80° C., preferably at least 85° C., in particular at least 90° C. or 100° C. On the other hand, the glass transition temperature ($T_g$) of the copolyamide (A) is at most 150° C., preferably at most 135° C., and particularly preferably at most 125° C. The preferred glass transition temperature ($T_g$) of component (A) is therefore in the range from 80 to 135° C. or from 90 to 135° C. or from 100 to 135° C., in particular in the range from 85 to 125° C.

Said $T_g$ range is achieved in combination with the cycloaliphatic systems, e.g. MACM10 or MACM12, when a sufficiently large proportion, as described above for the copolyamides (A) is replaced by aliphatic fractions, e.g. PA 1010 or PA 1012. The reduction of the glass transition temperature ($T_g$) in the invention, in comparison with homopolyamides based on cycloaliphatic diamines, achieves higher flowability of the polymer melt in the invention and therefore better processability. The polyamide molding compositions of the invention solidify less rapidly (than homopolyamide molding compositions) and injection molding therefore achieves a qualitatively better surface (smoother surface) and higher weld line strengths via avoidance of flow lines or other artifacts. The copolyamides of the invention can moreover be produced and processed under less aggressive conditions, i.e. at temperatures that are (from 10° C. to 30° C.) lower, and moldings manufactured therefrom therefore have markedly fewer inclusions (stemming from the polycondensation process) and markedly less diskoloration, and this is in particular of exceptional importance for transparent materials and their applications in the optical sector.

Component (B) used comprises a further polymer, which is preferably an amorphous or semicrystalline polyamide or copolyamide as in the following formula (II):

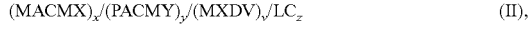

$$(MACMX)_x/(PACMY)_y/(MXDV)_v/LC_z \qquad (II),$$

where the definitions are as follows:
X, Y, and V=aliphatic dicarboxylic acid(s) having from 9 to 18 and 36 carbon atoms, and also terephthalic acid (T) and isophthalic acid (I), and also mixtures thereof
x=from 0 to 100% by weight, y=from 0 to 100% by weight, v=from 0 to 100% by weight,
LC=lactam(s) and/or aminocarboxylic acid(s) having from 6 to 12 carbon atoms, z=from 0 to 100% by weight,
v+x+y+z=100% by weight.

Examples of preferred representatives of this type of component (B) are the following polyamides or copolyamides: MACM10, MACM12, MACM14, MACMI/12, MACMI/MACMT/12, MACMI/PACMT/12, PA11, PA12, where I is isophthalic acid and T is terephthalic acid.

The further polymer (component (B)) can moreover be selected from the group consisting of polyetheresteramides, polyetheramides, polyesteramides, and mixtures of these. Said copolymers can have a random, alternating, or block structure. The polyamide content here is preferably based on PA6, PA66, PA69, PA610, PA612, PA99, PA1010, PA1012, PA1014, PA11, PA12 polyamides, or their mixtures. Preference is given to the following types of polyamide: PA1010, PA11, and PA12. The polyether components of said copolymers are based on the diols or diamines of the polyethylene glycols and/or polypropylene glycols and/or polytetramethylene glycols. The ester components or polyester components are based on polyesters of aliphatic and/or aromatic dicarboxylic acids with aliphatic diols, preferably on dimer fatty acid diols.

The polyamide molding compositions of the invention preferably comprise:
from 55 to 100% by weight of component (A),
from 0 to 45% by weight of component (B),
from 0 to 5% by weight of component (C),
and particularly preferably:
from 65 to 90% by weight of component (A),
from 10 to 35% by weight of component (B),
from 0 to 5% by weight of component (C).

However, the polyamide molding compositions of the invention can comprise the usual small proportions (less than 10% by weight, preferably less than 5% by weight, particularly preferably less than 3% by weight) of the usual additives (component C). The concentration of the additives (component C) is therefore preferably in the range from 0.01 to 5% by weight, in particular in the range from 0.3 to 3% by weight. The additives mentioned can be stabilizers, such as UV stabilizers, heat stabilizers, or free-radical scavengers, and/or can be processing aids, inclusion inhibitors, lubricants, mold-release aids, or plasticizers, and/or can be functional additives, preferably for influencing optical properties, such as in particular refractive index, or can be a combination or a mixture thereof. The molding compositions can moreover comprise (as component C) nanoscale fillers and/or nanoscale functional materials, e.g. laminar minerals, or metal oxides, where these increase the refractive index, or optical brighteners or dyes, e.g. photochromic dyes.

For the purposes of the invention, the molding compositions can moreover comprise the fillers and/or additional materials that are familiar to the person skilled in the art, examples being glass fibers, glass beads, carbon fibers, carbon black, graphite, flame retardants, mineral, e.g. titanium dioxide, calcium carbonate, or barium sulfate, or, for example, impact modifiers, such as functionalized polyolefins.

Preferred impact modifiers derive from the group selected from acid-modified ethylene-α-olefin copolymers, ethylene-glycidylmethacrylic acid copolymers, and methacrylate-butadiene-styrene copolymers.

However, the molding compositions of the invention can also receive additions of fillers or reinforcing agents. In this case, the moldings produced from the molding compositions are naturally non-transparent. Reinforcing agents that can be used are not only glass fibers and carbon fibers but also in particular those based on renewable raw materials and on biocontents above 50%. It is particularly preferable to use natural fibers, e.g. cellulose fibers, hemp fibers, flax fibers, cotton fibers, wool fibers, or wood fibers.

Polymer components (A) and (B) are produced in known pressure vessels. A pressure phase is first conducted at from 250° C. to 320° C. This is followed by depressurization at from 250° C. to 320° C.

Devolatilization is conducted at from 260° C. to 320° C. The polyamide molding composition is then discharged in strand form, cooled in a water bath to from 5° C. to 80° C., and pelletized. The pellets are dried at 80° C. for 12 hours to a water content below 0.06%. Additives, such as lubricants, dyes, stabilizers, or others, can be applied to, or sintered onto, the pellets during the drying process, with simultaneous circulation of the pellets.

For adjustment to the desired relative viscosity (components (A) and (B)) of from 1.45 to 2.30, measured in 0.5% strength by weight m-cresol solution, preferably from 1.55 to 2.00, and particularly preferably from 1.60 to 1.90, either the diamine or the dicarboxylic acids can be used in a slight excess of from 0.01 to 2 mol %. Regulation is preferably conducted by using monoamine or monocarboxylic acids at from 0.01 to 2.0% by weight, preferably from 0.05 to 0.5% by weight. Suitable regulators are benzoic acid, acetic acid, propionic acid, stearylamine, or a mixture of these. Particular preference is given to regulators having amine groups or having carboxylic acid groups, where these also comprise stabilizer groups of HALS type or of tert-butylphenol type, examples being triacetonediamine or ditriacetonediamine derivatives of isophthalic acid.

Suitable catalysts for accelerating the polycondensation reaction are phosphorus-containing acids, e.g. $H_3PO_2$, $H_3PO_3$, or $H_3PO_4$, salts of these, or organic derivatives, where these simultaneously reduce diskoloration during processing. The amounts added of the catalysts are in the range from 0.01 to 0.5% by weight, preferably in the range from 0.03 to 0.1% by weight. Suitable antifoams for avoidance of foaming during devolatilization are aqueous emulsions which comprise silicones or silicone derivatives, in the range from 0.01 to 1.0% by weight, preferably in the range from 0.01 to 0.10, for 10% strength emulsion.

Amounts of from 0.01 to 0.5% by weight of suitable heat stabilizers or of suitable UV stabilizers can be added to the mixture prior to the polycondensation process. It is preferable to use high-melting-point types. It is particularly preferable to use Irganox 1098.

The following known mixing processes can be used to equip the transparent molding compositions of the invention with additives, e.g. stabilizers, lubricants, such as paraffin oils or stearates, dyes, fillers, impact modifiers, such as ethylene-glycidyl methacrylate terpolymers, preferably with a refractive index in the range of the molding compositions of the invention, or maleic-anhydride-grafted polyethylenes, or propylenes, or reinforcing materials, such as glass fibers or glass beads, or nanoparticles, where these give a transparent dispersion, for example, or a mixture of the additives, particular processes being extrusion in single- or multiscrew extruders using melt temperatures of from 250° C. to 350° C.

Processes suitable for producing high-transparency moldings from the transparent polyamide molding compositions of the invention are injection-molding processes or injection-compression-molding processes at melt temperatures of from 230° C. to 320° C., where the mold temperatures are set at from 40° C. to 130° C. and where, if appropriate, the mold, at temperatures from 40° C. to 130° C., applies compression to the hot molding, after material has been charged to the cavity. An expansion injection-compression-molding process is a particularly suitable process for producing defect-free, low-stress molding surfaces from the transparent polyamide molding compositions of the invention, examples being lenses for spectacles, or high-quality casing parts; in this process, materials are charged to cavities with wall thicknesses of from 1 to 5 mm, and the mold cavity is enlarged while charging of material continues to give higher wall thicknesses.

Suitable processes for producing foils, tubes, and semifinished products in single- or multilayer form from the transparent polyamide molding compositions of the invention are extrusion processes in single- or multiscrew extruders using melt temperatures of from 250° C. to 350° C., where suitable adhesion promoters in the form of appropriate copolymers or blends can be used, as a function of the compatibility of the various layers.

Moldings composed of the polyamide molding compositions of the invention can be bonded to one another by usual processes, for example by ultrasound welding, incandescent-wire welding, frictional welding, spin welding, or laser welding via modification with laser-active dyes with absorption in the range from 800 nm to 2000 nm.

Suitable processes for producing hollow bodies and bottles in single- or multilayer form from the transparent polyamide molding compositions of the invention are injection-blow-molding processes, injection-stretch-blow-molding processes, and extrusion-blow-molding processes.

The molding compositions of the invention can also be processed to give foils, e.g. flat foils, blown foils, cast foils, or multilayer foils. Preferred methods for further processing of the foils are lamination, in-mold coating, stretching, orientation, printing, or dyeing.

Moldings can be bulk-dyed or dyed in a subsequent process by using what are known as dip baths. Where appropriate, moldings are subjected to further operations by milling, drilling, grinding, laser-marking, laser-cutting, and/or laser-welding.

Suitable uses for moldings composed of the transparent polyamide compositions of the invention are viewing windows for heating systems with direct oil contact, filter cups for drinking-water treatment, baby bottles, carbonization bottles, crockery, flow meters for gases or liquids, clock casings, watch casings, and lamp housings and reflectors for automobile lamps.

The examples below will now be used to illustrate the invention, which is however not restricted thereto.

EXAMPLES

The polyamide molding composition of the invention is produced in known laboratory pressure autoclaves of capacity 130 L. A pressure phase is first conducted at 290° C. This is followed by depressurization at 280° C. Devolatilization is conducted at 280° C. The polyamide molding composition is then discharged in the form of a strand, cooled in a water bath, and pelletized. The pellets are dried at 80° C. for 12 h to a water content below 0.06%. High-transparency moldings or, respectively test specimens are produced from the transparent polyamide molding compositions of the invention in an Arburg 420C Allrounder 1000-250 injection-molding machine at melt temperatures of from 250° C. to 280° C., where the temperature of the mold was adjusted to 60° C. The screw rotation rate was from 150 to 400 rpm.

The materials or moldings produced have the properties listed in Tables 1 and 2.

TABLE 1

|  | Unit | IE1 | IE2 | IE3 | CE1 |
| --- | --- | --- | --- | --- | --- |
| Constitution | | | | | |
| Polyamide (to ISO 1874) | — | MACM10/1010 (66:34) | MACM12/1012 (66:34) | MACM10/1010 (60:40) | 10I/1010 (50:50) |
| MACM | mol % | 33 | 33 | 30 | |
| Isophthalic acid | mol % | 0 | 0 | 0 | 25 |
| 1,10-Decanediamine | mol % | 17 | 17 | 20 | 50 |
| Sebacic acid | mol % | 50 | 0 | 50 | 25 |
| Dodecanedioic acid | mol % | 0 | 50 | 0 | 0 |
| Biocontent to ASTM D6866-06a | % | 59 | 62 | 62.5 | 80 |
| Properties | | | | | |
| MVR (275° C./5 kg) | cc/10 min | 85 | 52 | 72 | 42 |
| Glass transition temperature ($T_g$) | ° C. | 115 | 110 | 113 | 59 |
| Melting point | ° C. | — | — | — | — |
| Enthalpy of fusion | J/g | <5 | <5 | <5 | <5 |
| Relative viscosity | — | 1.80 | 1.85 | 1.80 | 1.95 |
| Tensile modulus of elasticity | MPa | 1700 | 1650 | 1700 | 1630 |
| Ultimate tensile strength | MPa | 65 | 60 | 63 | 57 |
| Tensile strain at break | % | 180 | 170 | 190 | 210 |
| Charpy impact resistance, 23° C. | kJ/m$^2$ | no fracture | no fracture | no fracture | 120 |
| Charpy impact resistance, −30° C. | kJ/m$^2$ | no fracture | no fracture | no fracture | 90 |
| Charpy notched impact resistance, 23° C. | kJ/m$^2$ | 7 | 9 | 7 | 5 |

TABLE 1-continued

|  | Unit | IE1 | IE2 | IE3 | CE1 |
|---|---|---|---|---|---|
| Deformation in controlled-climatic-conditions test, 55° C./95% rel. hum./168 h | mm/100 mm | 0.6 | 0.9 | 1.2 | >10 |
| Water absorption, 23° C./50% relative humidity | % | 1.1 | n.d. | n.d. | n.d. |
| Light transmittance to ASTM D1003 | % | 93 | 93 | 93 | 93 |
| Haze to ASTM D1003 | % | 2.3 | 7.2 | 4.5 | 1.2 |
| Gloss 20° | % | 148 | 140 | 145 | 160 |
| Gloss 60° | % | 145 | 135 | 140 | 150 |

TABLE 2

|  | Unit | IE4 | IE5 | CE2 | CE3 |
|---|---|---|---|---|---|
| Constitution | | | | | |
| Polyamide (to ISO 1874) | — | MACM10/1010 (56:44) | MACM10/1010 (50:50) | MACM10/1010 (46:54) | PACM10/1010 (50:50) |
| MACM | mol % | 28 | 25 | 23 | 0 |
| PACM | mol % | 0 | 0 | 0 | 25 |
| 1,10-Decanediamine | mol % | 22 | 25 | 27 | 25 |
| Sebacic acid | mol % | 50 | 50 | 50 | 50 |
| Biocontent to ASTM D6866-06a | % | 65 | 68 | 70.5 | 62 |
| Properties | | | | | |
| MVR (275° C./5 kg) | cc/10 min | 55 | 53 | 80 | n.d. |
| Glass transition temperature ($T_g$) | ° C. | 104 | 96 | 89 | 84 |
| Melting point | ° C. | — | — | — | 172 |
| Enthalpy of fusion | J/g | <5 | <5 | <5 | 43 |
| Relative viscosity | — | 1.84 | 1.86 | 1.78 | 1.82 |
| Tensile modulus of elasticity | MPa | 1680 | 1670 | 1650 | 1610 |
| Ultimate tensile strength | MPa | 60 | 60 | 58 | 58 |
| Tensile strain at break | % | 190 | 200 | 120 | 230 |
| Charpy impact resistance, 23° C. | kJ/m$^2$ | no fracture | no fracture | no fracture | no fracture |
| Charpy impact resistance, −30° C. | kJ/m$^2$ | no fracture | no fracture | no fracture | no fracture |
| Charpy notched impact resistance, 23° C. | kJ/m$^2$ | 7 | 7 | 6 | 7 |
| Deformation in controlled-climatic-conditions test, 55° C./95% rel. hum./168 h | mm/100 mm | 1.9 | 3.6 | 7.8 | 4.5 |
| Water absorption, 23° C./50% relative humidity | % | 1.0 | 1.0 | 0.99 | n.d. |
| Light transmittance to ASTM D1003 | % | 93 | 93 | 93 | 93 |
| Haze to ASTM D1003 | % | 2.3 | 3.1 | 1.0 | 1.4 |
| Gloss 20° | % | 145 | 140 | 150 | 153 |
| Gloss 60° | % | 140 | 135 | 148 | 145 | n.d.: not determined.

The glass transition temperature of the transparent homopolyamides MACM10 and MACM12 is 165° C. and, respectively, 155° C., and their melt viscosity is in the range from 15 to 22 cm$^3$/10 min (MVR, 275° C./5 kg), for solution viscosity (relative viscosity) in the range from 1.85 to 1.80. When the copolyamides of the invention are compared with the known homopolyamides they therefore have significantly lower melt viscosity for identical relative viscosity, and are therefore easier to process. The deformation of the moldings of inventive example 1 in the controlled-climatic-conditions test (0.6 mm) is moreover only slightly greater than that of moldings made of the homopolyamide MACM10 (deformation 0.5 mm).

The aliphatic content in the copolyamide of the invention (inventive examples 1, 4, and 5) permitted a further reduction in water absorption in comparison with the transparent homopolyamide MACM10: 1.20% at 23° C. and 50% relative humidity.

Relative viscosity $\eta_{rel}$) was determined to DIN EN ISO 307 in 0.5% strength by weight m-cresol solution at a temperature of 20° C.

Glass transition temperature ($T_g$), melting point ($T_m$), and enthalpy of fusion ($H_m$) were determined to ISO 11357-1/2. Differential scanning calorimetry (DSC) was conducted with a heating rate of 20 K/min.

Tensile modulus of elasticity, ultimate tensile strength, and tensile strain at break were determined to ISO 527, using a tensile testing speed of 1 mm/min (tensile modulus of elasticity) or 50 mm/min (ultimate tensile strength, tensile strain at break) on an ISO tensile specimen, standard: ISO/CD 3167, type A1, 170×20/10×4 mm at a temperature of 23° C.

Impact resistance and notched impact resistance by the Charpy method were measured to ISO 179/keU on an ISO test specimen, standard: ISO/CD 3167, type B1, 80×10×4 mm at a temperature of −30° C. and 23° C.

Light transmittance (transparency) and haze were determined to ASTM D1003 on sheets of dimensions 2×60×60 mm or on disks measuring 2×70 mm at a temperature of 23° C., using haze-gard plus measuring equipment from Byk Gardner and CIE illuminant C. The light transmittance values are stated in % of the amount of incident light.

Gloss was measured to DIN EN ISO 2813 on a disk of dimensions 70×2 mm at a temperature of 23° C., using a Minolta Multi Gloss 268 at an angle of 20° and 60°.

The controlled-climatic-conditions test was used to determine the deflection of a sheet of dimensions 100×100×2 mm under its own weight at a temperature of 55° C. and at relative humidity of 95%. For this, one edge of the sheet was raised by 25 mm, and deflection was measured in the middle of the sheet (positional change in comparison with initial condition) after 168 h.

MVR (melt volume rate) was determined to ISO 1133 at 275° C. with a load of 5 kg.

The present invention therefore provides novel polyamide molding compositions which feature markedly better processability, in particular in the injection-molding process, together with acceptable deformation in the controlled-climatic-conditions test, very good transparency, low haze, and indeed increased biocontent.

What is claimed is:

1. A polyamide molding composition based on transparent copolyamides for producing transparent moldings, where the molding composition comprises:
 (A) from 40 to 100% by weight of at least one transparent copolyamide with a glass transition temperature ($T_g$) of at least 80° C. and at most 150° C., composed of at least two diamines differing from one another, wherein the at least two diamines are a mixture of
  (a) from 50 to 68 mol % of a cycloaliphatic diamine selected from the group consisting of bis(4-amino-3-methylcyclohexyl)methane (MACM), bis (4-amino-3-ethylcyclohexyl)methane (EACM), bis(4-amino-3,5-dimethyl-cyclohexyl)methane (TMACM), and mixtures thereof, and
  (b) from 32 to 50 mol % of 1,10-decanediamine, wherein the content of (a) and (b) supplement to 100 mol % constituting the total amount of diamines, and also of one or more aliphatic dicarboxylic acids selected from the group consisting of sebacic acid, undecanedioic acid, dodecanedioic acid, and mixtures thereof,
 (B) from 0 to 60% by weight of at least one further polymer selected from the group consisting of amorphous homopolyamide, amorphous copolyamide, semicrystalline homopolyamide, semicrystalline copolyamide, polyetheresteramides, polyetheramides, polyesteramides, and mixtures thereof, and,
 (C) from 0 to 10% by weight of conventional additives selected from the group consisting of UV stabilizers, heat stabilizers, free-radical scavengers, processing aids, inclusion inhibitors, lubricants, demolding aids, plasticizers, functional additives for influencing optical properties, impact modifiers, nanoscale fillers, nanoscale materials, optical brighteners, dyes, and mixtures thereof,
 where the entirety of components (A), (B), and (C) gives 100% by weight.

2. The polyamide molding composition based on transparent copolyamides as claimed in claim 1, wherein the copolyamides are mainly based on monomers which are accessible from renewable raw materials, and where the biocontent to ASTM D6866-068a of the copolyamide (A) and/or of the further component (B) is at least 50% by weight.

3. The polyamide molding composition as claimed in claim 1, wherein the glass transition temperature of the copolyamide (A) is at least 85° C.

4. The polyamide molding composition as claimed in claim 1, wherein the copolyamide (A) has been selected from the group consisting of MACM10/1010, and MACM12/1012.

5. The polyamide molding composition as claimed in claim 1, comprises a blend of the copolyamide (A) with the component (B), where the component (B) comprises a polymer which is an amorphous or semicrystalline polyamide or copolyamide, characterized by chains having the following formula (II):

$$(MACMX)_x/(PACMY)_y/(MXDV)_v/LC_z \qquad (II),$$

where the definitions are as follows:
X, Y, and V=aliphatic dicarboxylic acid(s) having from 9 to 18 and 36 carbon atoms, and also terephthalic acid (T) and isophthalic acid (I), terephthalic acid (T), isophthalic acid (I), or mixtures thereof,
x=from 0 to 100% by weight, y=from 0 to 100% by weight, v=from 0 to 100% by weight,
LC=lactam(s) and/or aminocarboxylic acid(s) having from 6 to 12 carbon atoms,
z=from 0 to 100% by weight, and
v+x+y+z=100% by weight.

6. The polyamide molding composition based on transparent copolyamides as claimed in claim 1, wherein the copolyamides are mainly based on monomers which are accessible from renewable raw materials, and where the biocontent to ASTM D6866-068a of the copolyamide (A) and/or of the further component (B) is from 50 to 75% by weight.

7. The polyamide molding composition as claimed in claim 1, wherein the aliphatic diacid is composed of at least 50 mol % of sebacic acid, based on the total amount of diacids.

8. The polyamide molding composition as claimed in claim 1, wherein the glass transition temperature of the copolyamide (A) is from at least 100° C. to 135° C.

9. A polyamide molding composition based on transparent copolyamides for producing transparent moldings, where the molding composition comprises:
(A) from 40 to 100% by weight of at least one transparent copolyamide with a glass transition temperature ($T_g$) of at least 80° C. and at most 150° C., characterized by chains having the following formula (I):

$$(MACMX)_x/(10Y)_y/LC_z \qquad (I),$$

where the definitions are as follows:
X and Y=aliphatic dicarboxylic acid(s) selected from the group consisting of sebacic acid, undecanedioic acid, dodecanedioic acid, and mixtures thereof,
x=from 50 to 68 mol %,
y=from 32 to 50 mol %
LC=lactam(s) and/or aminocarboxylic acid(s) having from 6 to 12 carbon atoms,
z=from 0 to 50 mol %,
where x+y+z=100 mol %, and
the sum of the contents represented by X, 10Y, and LC is at least 50% by weight.

10. The polyamide molding composition as claimed in claim 9, wherein component LC in the formula (I) has been selected from the group consisting of lactam 11, lactam 12, α,ω-aminocarboxylic acids having from 10 to 12 carbons atoms, and mixtures thereof.

11. A molding obtained from the polyamide molding compositions as claimed in claim 1 by injection-molding processes or injection-compression-molding processes at temperatures of from 230° C. to 320° C., where the mold temperatures are set in a range from 40° C. to 130° C.

12. The molding as claimed in claim 11, characterized by light transmittance of at least 85%, which is measured to ASTM D1003, determined on sheets of dimensions 2×60×60 mm or on disks of dimensions 2×70 mm, at a temperature of 23° C., with a haze-gard plus measuring device from Byk Gardner using CIE illuminant C.

13. The molding as claimed in claim 11, characterized by haze of at most 10%, which is measured to ASTM D1003, for a sheet of thickness 2 mm.

14. The molding as claimed in claim 11, characterized by deformation of at most 4 mm in a controlled-climatic-conditions test, where the deflection of a sheet of dimensions 100×100×2 mm is determined in the controlled-climatic-conditions test under its own weight at a temperature of 55° C. and with relative humidity of 95%, and to this end one edge of the sheet is raised by 25 mm and the deflection of the sheet is measured in the middle after 168 hours.

15. The molding as claimed in claim 11, characterized by light transmittance of at least 90%, which is measured to ASTM D1003, determined on sheets of dimensions 2×60×60 mm or on disks of dimensions 2×70 mm, at a temperature of 23° C., with a haze-gard plus measuring device from Byk Gardner using CIE illuminant C.

16. The molding as claimed in claim 11, characterized by haze of at most 3%, which is measured to ASTM D1003, for a sheet of thickness 2 mm.

17. The molding as claimed in claim 11, characterized by deformation of at most 2 mm in a controlled-climatic-conditions test, where the deflection of a sheet of dimensions 100×100×2 mm is determined in the controlled-climatic-conditions test under its own weight at a temperature of 55° C. and with relative humidity of 95%, and to this end one edge of the sheet is raised by 25 mm and the deflection of the sheet is measured in the middle after 168 hours.

18. A method of using the polyamide molding composition as claimed in claim 1 for producing transparent injection moldings with high toughness, low water-absorption, low warpage in a controlled-climatic-conditions test, and deformation of at most 4 mm in the controlled-climatic-conditions test, where the deflection of a sheet of dimensions 100×100×2 mm is determined in the controlled-climatic-conditions test under its own weight at a temperature of 55° C. and with relative humidity of 95%, and to this end one edge of the sheet is raised by 25 mm and the deflection of the sheet is measured in the middle after 168 hours.

19. The method as claimed in claim 18, where the deformation is at most 2 mm in the controlled-climatic-conditions test.

* * * * *